United States Patent
Kim et al.

(10) Patent No.: US 10,046,333 B2
(45) Date of Patent: Aug. 14, 2018

(54) METHOD OF RESTORING ARSENIC-CONTAMINATED SOIL USING ALKALINE-ULTRASONIC WASHING AND MAGNETIC SEPARATION

(71) Applicant: KOREA INSTITUTE OF GEOSCIENCE AND MINERAL RESOURCES (KIGAM), Daejeon (KR)

(72) Inventors: Jae Gon Kim, Daejeon (KR); Chul Min Chon, Daejeon (KR); In Hyun Nam, Daejeon (KR); Jung Hwa Lee, Daejeon (KR); Yong Chan Cho, Daejeon (KR); Dong Hyun Seok, Daegu (KR)

(73) Assignee: KOREA INSTITUTE OF GEOSCIENCE AND MINERAL RESOURCES (KIGAM), Daejeon (KR)

( * ) Notice: Subject to any disclaimer, the term of this patent is extended or adjusted under 35 U.S.C. 154(b) by 404 days.

(21) Appl. No.: 14/993,207

(22) Filed: Jan. 12, 2016

(65) Prior Publication Data
US 2017/0100723 A1 Apr. 13, 2017

(30) Foreign Application Priority Data
Oct. 8, 2015 (KR) .................. 10-2015-0141653

(51) Int. Cl.
| | |
|---|---|
| *B03C 1/005* | (2006.01) |
| *B03C 1/28* | (2006.01) |
| *B03C 1/30* | (2006.01) |
| *B09C 1/02* | (2006.01) |
| *B09C 1/06* | (2006.01) |
| *B09C 1/08* | (2006.01) |
| *B01D 43/00* | (2006.01) |
| *B03B 7/00* | (2006.01) |

(52) U.S. Cl.
CPC .............. *B03C 1/005* (2013.01); *B01D 43/00* (2013.01); *B03B 7/00* (2013.01); *B03C 1/28* (2013.01); *B03C 1/30* (2013.01); *B09C 1/02* (2013.01); *B09C 1/06* (2013.01); *B09C 1/08* (2013.01); *B03C 2201/18* (2013.01)

(58) Field of Classification Search
CPC .. B03C 1/005; B03C 1/28; B03C 1/30; B03C 2201/18; B09C 1/02; B09C 1/06; B09C 1/08; B01D 43/00; B03B 7/00
See application file for complete search history.

(56) References Cited

U.S. PATENT DOCUMENTS

| | | | |
|---|---|---|---|
| 8,475,080 B2 * | 7/2013 | Kim | B09C 1/08 405/128.75 |
| 2012/0138528 A1 * | 6/2012 | Burba, III | B01D 15/00 210/638 |

\* cited by examiner

*Primary Examiner* — David A Reifsnyder
(74) *Attorney, Agent, or Firm* — Ladas & Parry LLP; Loren K. Thompson

(57) ABSTRACT

Provided is a method of restoring arsenic-contaminated soil. In the present invention, arsenic may be easily separated from soil particles by washing the arsenic-contaminated soil by using a basic solution and simultaneously irradiating the soil with ultrasonic waves. Also, since iron oxide and manganese oxide are exposed to the basic solution by dissolving a portion of the surface of a silicate mineral using the basic solution, a residual form of arsenic may be removed.

12 Claims, 3 Drawing Sheets

| | NaOH conc (M) | 0.10 | 0.20 | 0.30 | 0.40 | 0.50 | 0.75 | 1.00 | 1.25 | 1.50 |
|---|---|---|---|---|---|---|---|---|---|---|
| SOIL:SOLUTION (1:10) 2hr SHAKING | As conc of solution (mg/L) | 4.28 | 5.55 | 5.51 | 5.49 | 6.38 | 5.86 | 5.56 | 5.19 | 5.20 |
| SOIL:SOLUTION (1:10) 2hr SHAKING ULTRASONIFICATION(10min) | NaOH conc (M) | 0.10 | 0.20 | 0.30 | 0.40 | 0.50 | 0.75 | 1.00 | 1.25 | 1.50 |
| | As conc of solution (mg/L) | 6.24 | 7.54 | 8.03 | 7.82 | 8.50 | 7.92 | 7.24 | 7.01 | 6.34 |

FIG. 2

| COND | CASE 1 | CASE 2 | CASE 3 | CASE 4 | CASE 5 | | | | | |
|---|---|---|---|---|---|---|---|---|---|---|
| | | | | | 0.3T MP | 0.3T NMP | 0.6T MP | 0.6T NMP | 0.9T MP | 0.9T NMP |
| R (%) | 98.3 | 97.4 | 99.2 | 99.3 | 13.4 | 82.0 | 19.1 | 76.1 | 23.6 | 71.6 |
| AS Conc (mg/kg) | 84.2 | 61.3 | 51.7 | 39.2 | 24.0 | 25.6 | 38.1 | 23.3 | 28.2 | 23.4 |

- CASE 1 : DISTILLED WATER, 2 hr SHAKING
- CASE 2 : DISTILLED WATER, 2 hr SHAKING, 10 min ULTRASONIFICATION
- CASE 3 : 0.5M NaOH, 2 hr SHAKING
- CASE 4 : 0.5M NaOH, 2 hr SHAKING, 10 min ULTRASONIFICATION
- CASE 5 : 0.5M NaOH, 2 hr SHAKING, 10 min ULTRASONIFICATION R: RECOVERY, C: CONCENTRATION
MP: MAGNETIC PARTICLES, NMP: NON-MAGNETIC PARTICLES

FIG. 3

METHOD OF RESTORING ARSENIC-CONTAMINATED SOIL USING ALKALINE-ULTRASONIC WASHING AND MAGNETIC SEPARATION

BACKGROUND OF THE INVENTION

The present invention disclosed herein relates to a pollution reduction technique, and more particularly, to a method of restoring soil contaminated by arsenic.

Soil contamination occurs through various routes, such as waste dumping, hazardous substance leakage, use of pesticides and fertilizers, and incineration. The soil contamination may not only cause various direct problems, such as disturbance of ecosystems, contamination of crops, and human absorption of contaminants, but may also cause secondary pollutions of surface water, underground water, and air. Also, since the soil contamination is chronic in comparison to air and water pollution, it takes a lot of time and money to restore soil quality.

In Korea, the soil environment conservation act has been enacted and conducted in recognition of the severity of adverse effects of soil contamination on human and ecosystems. Reference values for 16 items (cadmium (Cd), copper (Cu), arsenic (As), mercury (Hg), lead (Pb), chromium VI ($Cr_6^+$), zinc (Zn), nickel (Ni), fluorine (F), organic phosphorous compounds, cyanide (CN), benzene, toluene, ethylbenzene and xylene (BTEX), total petroleum hydrocarbon (TPH), trichloroethylene (TCE), and perchloroethylene (PCE)) have been established in the soil environment conservation act and managed.

As a method of restoring soil contaminated by arsenic among the above 16 items, various methods, such as solidification and stabilization using microorganisms and chemicals, have been developed and used.

According to a soil contamination process test method of the soil environment conservation act, contaminants are dissolved from contaminated soil by using aqua regia, and it is then determined whether the amount of extracted arsenic exceeds the reference value (aqua regia extraction method or total content analysis). Since the aqua regia is the strongest acid, almost all of arsenic in the contaminated soil is extracted when using the aqua regia.

Since the solidification and stabilization methods among the methods of restoring arsenic-contaminated soil are methods which do not remove arsenic in the soil but simply transform the soil into a less toxic and mobile form, the solidification and stabilization methods may not satisfy the total content analysis.

Also, in a case in which a washing method using an acidic solution is used, although a relatively unstable form (water-soluble form, adsorbed form, and carbonate form) of arsenic may be extracted, there are limitations in extracting a relative stable residual form of arsenic. The washing of the arsenic-contaminated soil using the acidic solution may result in the increase of mobility and toxicity by the absorption of dissolved arsenic ions on iron oxide having a positive charge in an acidic environment.

That is, when the arsenic-contaminated soil is washed using the acidic solution, arsenic co-precipitated with iron oxide or manganese oxide is dissolved and present in the form of a negative charge, wherein, since the surface of the iron oxide or manganese oxide is positively charged in the acidic environment, the dissolved arsenic ions are again adsorbed on the iron oxide or manganese oxide. Accordingly, arsenic removal efficiency is reduced.

Thus, it is expected that it may be difficult to achieve restoration purpose when a typical soil washing method using an acidic washing solution is used for soil contaminated by a stable form of high concentration arsenic. Therefore, there is a need to develop a novel method which may overcome the limitations of the typical method.

SUMMARY OF THE INVENTION

The present invention provides a novel method of effectively restoring arsenic-contaminated soil.

The present invention also provides a novel method of restoring soil contaminated by cationic heavy metals, such as copper, zinc, and cadmium, in addition to arsenic.

Other objects unspecified in the present invention will be additionally considered within the range that can be easily inferred from the following detailed descriptions and effects thereof.

Embodiments of the present invention provide a method of restoring heavy metal-contaminated soil including: a particle size separation step of separating coarse-grained soil and fine-grained soil from each other by performing particle size separation on heavy metal-contaminated soil, particularly, arsenic-contaminated soil; a washing and separation step of forming a suspension by adding the fine-grained soil to a basic solution and separating a heavy metal from the fine-grained soil by irradiation of ultrasonic waves; a magnetic separation step of separating a magnetic material and a non-magnetic material in the suspension from each other by using a magnet, after subjecting to the washing and separation step; and a step of collecting the fine-grained soil completed with a solid-liquid separation treatment of the suspension.

In some embodiments, in the particle size separation step, the coarse-grained soil and the fine-grained soil are separated based on a diameter of 1 mm to 3 mm, for example, 2 mm.

In other embodiments, the basic solution may have a pH value of equal to or greater than a point of zero charge (PZC) of the contaminated soil.

In still other embodiments, a sodium hydroxide aqueous solution may be used as the basic solution to improve dispersion efficiency of the fine-grained soil.

In even other embodiments, the ultrasonic waves may be irradiated for 10 minutes to 120 minutes to obtain a maximum local pressure of 1,000 atm and a maximum local temperature of 5,000 K in the suspension.

In yet other embodiments, the magnet having a magnetic field strength of 5,000 gauss to 9,000 gauss is used to separate the magnetic material including iron oxide and manganese oxide to which arsenic is adsorbed.

In further embodiments, the basic solution includes 0.1 M to 1 M NaOH and a solid-liquid ratio (volume ratio) of the contaminated soil to the basic solution is in a range of 1/4 to 1/10.

Although arsenic is a main target of the present invention, the present invention may be applied to other heavy metals including copper, cadmium, and zinc.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 2, as a table illustrating the experimental results showing the effect of the present invention, illustrates arsenic removal rates depending on the presence of ultrasonic irradiation and the concentration of sodium hydroxide; and FIG. 3 is a table illustrating final experimental results showing the effect of the present invention.

Figure 1:
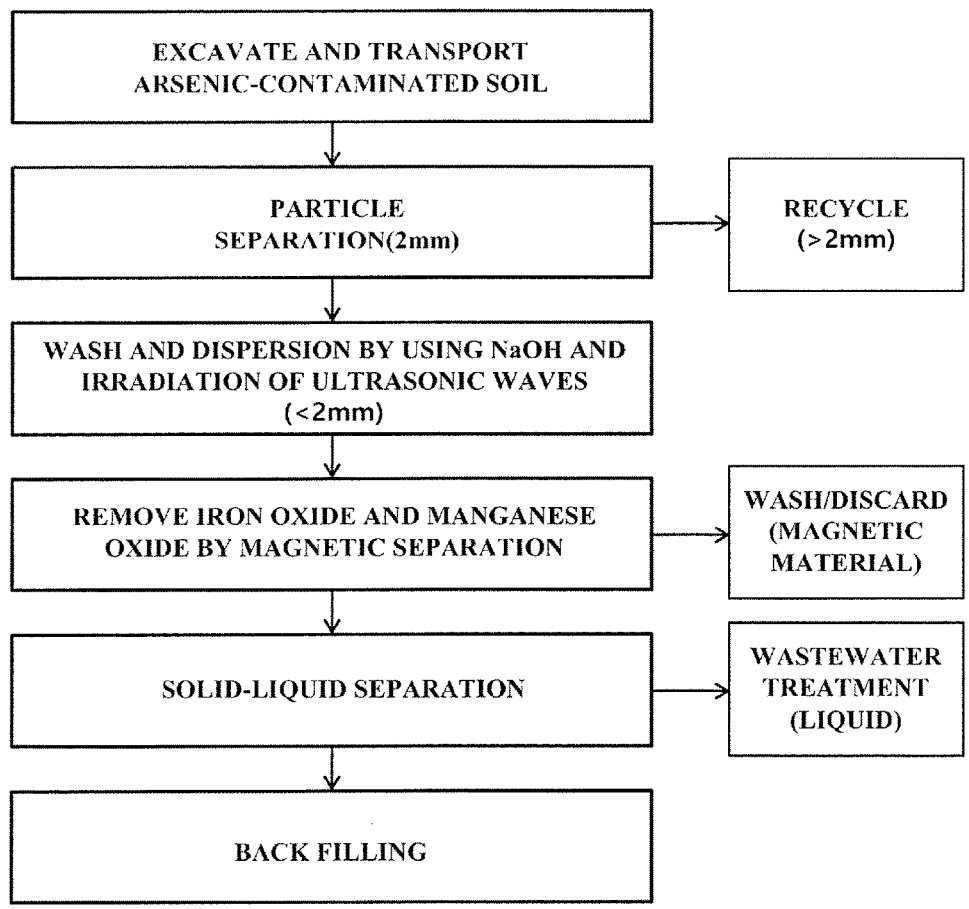
FIG. 1 is a schematic flowchart of a method of restoring heavy metal-contaminated soil according to an embodiment of the present invention.

The attached drawings are presented for purposes of explanation only, and the technical scope of the present invention is not limited thereto.

DETAILED DESCRIPTION OF PREFERRED EMBODIMENTS

In describing the present invention, detailed descriptions related to well-known functions or configurations will be ruled out in order not to unnecessarily obscure subject matters of the present invention.

The present invention is to restore heavy metal-contaminated soil, wherein, particularly, arsenic-contaminated soil is a key target. However, the present invention is not restrictively applied to only the arsenic-contaminated soil, but may be widely applied to soil contaminated by heavy metals such as cadmium, copper, and zinc.

First, the arsenic-contaminated soil, as the key target of the present invention, will be described. A trivalent form of arsenic ($AsO_3^-$) is stable in the soil in a reducing environment and a pentavalent form of arsenic ($AsO_4^{3-}$) is stable in the soil in an oxidizing environment. In terms of minerals, pentavalent arsenic forms iron-arsenic compounds and manganese-arsenic compounds, such as $FeAsO_4$, $Fe_3(AsO_4)_2$, and $Mn_3(AsO_4)_2$, and trivalent arsenic forms arsenic sulfide minerals such as $AsS$, $As_2S_2$, and $As_2S_3$. In a weak reducing environment, $Fe(AsO_2)_2$ or $Ca(AsO_2)_2$ may be formed.

Since most of soils excluding wetland soils are in an oxidizing environment, arsenic in the pentavalent form forms iron and manganese compounds, and the iron-arsenic compounds are predominant. Thus, an important treatment target of the present invention is pentavalent arsenic.

The pentavalent arsenic forms an anionic complex to form a compound in such a manner that it is adsorbed to iron oxide and manganese oxide and co-precipitated. That is, iron oxide and manganese oxide has a variable surface charge. The iron oxide and manganese oxide have a positive surface charge in a pH of equal to or less than a point of zero charge (PZC) and have a negative surface charge in a pH of greater than the PZC. Since the soil in the oxidizing environment is mainly formed to have a pH of equal to or less than the PZC, the iron oxide has a positive charge, and eventually, anionic arsenic is adsorbed to or co-precipitated with the iron oxide or the manganese oxide.

The present invention aims at proposing a method of separating arsenic from contaminated soil based on microscopic analysis of the forms of arsenic present in the soil as described above.

Hereinafter, a method of restoring heavy metal-contaminated soil according to an embodiment of the present invention will be described in more detail with reference to the accompanying drawings.

FIG. 1 is a schematic flowchart of the method of restoring heavy metal-contaminated soil according to the embodiment of the present invention.

Referring to FIG. 1, in the present invention, arsenic-contaminated soil is first excavated and transported to a treatment facility.

Then, particle size separation is performed on the contaminated soil. The particle size separation separates coarse-grained soil and fine-grained soil based on a diameter of 1 mm to 3 mm. In the present embodiment, the particle size separation is performed based on a diameter of 2 mm. The reason for performing the particle size separation is that arsenic is almost not included in the coarse-grained soil having a diameter of greater than 2 mm. Arsenic is mainly adsorbed to and co-precipitated with the fine-grained soil. Another reason is that the standard of the soil contamination process test method itself is applied to only the soil having a diameter of 2 mm or less. In the present invention, the contaminated soil is separated by using a screen or the like. Since the coarse-grained soil almost does not include arsenic, the coarse-grained soil may be directly recycled. Since the fine-grained soil includes arsenic, a restoration treatment to be described later is necessary.

A washing and dispersion treatment is performed on the fine-grained soil. The washing and dispersion treatment is a process in which a suspension is prepared by adding the fine-grained soil to a basic solution and the suspension is then irradiated with ultrasonic waves while stirring.

Typical processes mainly dissolve and extract arsenic in a solid state in soil using acid, but, in the present invention, the basic solution is used to operate a completely different mechanism from a typical acid washing. Three reasons for using the basic solution may be summarized as follows.

First, it is for adjusting a pH of the suspension to be under a basic condition. As described above, since surfaces of iron oxide and manganese oxide have a positive charge in a pH of less than the PZCs, pentavalent arsenic is electrically adsorbed. Thus, in order to separate the arsenic, a pH of the surrounding must be equal to or greater than the PZCs of the iron oxide and manganese oxide. Since the PZCs of the iron oxide and manganese oxide are pH values of about 7 to 8, when a basic environment is provided, the surfaces of the iron oxide and manganese oxide may have a negative charge, and thus, the anionic arsenic is desorbed. Instead of a pH value of the basic solution itself, a pH value of the entire suspension, in which the soil and the basic solution are mixed, is set to 7 to 8 or more. A concentration of the basic solution may be set in consideration of this point, and when a sodium hydroxide aqueous solution is used as in the present embodiment, the concentration of the basic solution may be adjusted to a range of 0.1 M to 1 M. When the suspension is formed to be under the basic condition, the arsenic adsorbed and co-precipitated on the surface of the iron oxide and manganese oxide is desorbed and dissolved in the solution.

The second reason is that when the iron oxide and manganese oxide have a negative charge, dispersion may be promoted due to electrical repulsion between arsenic ions so that it beneficially acts on magnetic separation to be described later.

The third reason is that a silicate mineral, such as silicate, may be dissolved. The iron oxide and manganese oxide are precipitated between coarse-grain particles, such as silicate, to be present as a binder of a soil aggregate or may be present in the form of precipitates on the surface of the coarse-grain particles. The arsenic adsorbed on the iron oxide or manganese oxide, which is precipitated in the silicate mineral, is the residual form of arsenic as previously described, wherein it is almost difficult to remove the residual form of arsenic by a typical method.

In order to remove the residual form of arsenic, the iron oxide and manganese oxide in the silicate mineral must first be exposed to the basic solution. That is, the surface of the silicate mineral must be dissolved. In a typical washing method using an acidic solution, acid directly dissolves arsenic. However, in the present invention, the basic solution does not directly dissolve arsenic, but acts very uniquely in view of the fact that the basic solution acts to expose the iron oxide and manganese oxide to the solution by dissolving the silicate. When the iron oxide and manganese oxide are exposed to the basic solution while the surface of the silicate is dissolved, the arsenic adsorbed and co-precipitated on the iron oxide and manganese oxide is desorbed by the above-described action and moves in the solution. In addition, the iron oxide and manganese oxide in a solid state are detached into the solution while the surface of the silicate is dissolved.

As described above, there are three reasons for using the basic solution in the present invention, and the concentration and amount of the basic solution is adjusted so as to best satisfy the above reasons. In an embodiment of the present invention, a solid-liquid ratio (volume ratio) of the suspension is in a range of 1/4 to 1/10. In a case in which the solid-liquid ratio is greater than 1/4, since the amount of the soil is excessively large in comparison to the amount of the basic solution, washing and dispersion may not be facilitated and there is a limitation in dissolving the silicate. Also, in a case in which the solid-liquid ratio is less than 1/10, it is uneconomical because the amount of the basic solution is excessive in comparison to the expected effects.

A sodium hydroxide (NaOH) aqueous solution is used as the basic solution in the present embodiment. Also, other basic solutions, such as $CaOH_2$, may be used. However, in view of the promotion of the dispersion, the sodium hydroxide aqueous solution may be used. That is, although sodium hydroxide includes a monovalent cation (Na), $CaOH_2$ includes a divalent cation (Ca). Thus, it is better to use the sodium hydroxide solution including monovalent cations in consideration of the dispersion of the particles.

In the washing and dispersion process, the suspension is irradiated with ultrasonic waves. The ultrasonic waves may be differently adjusted depending on the amount of the suspension, but the suspension may be irradiated for 10 minutes to 120 minutes. The reasons for the ultrasonic irradiation include the promotion of the desorption of arsenic, the promotion of dispersion, and the increase of solubility. It is well known that a so-called "cavity-collapse" phenomenon occurs when ultrasonic irradiation is performed. That is, when the suspension is irradiated with ultrasonic waves, small air bubbles (cavitation) are formed and shock waves are generated while the air bubbles grow and are collapsed, and thus, a maximum local pressure of 1,000 atm and a maximum local temperature of 5,000 K are obtained. The shock waves apply an external force to the arsenic and the iron oxide or manganese oxide to promote the separation thereof. Also, the dispersion of the particles may be promoted. Furthermore, when the temperature is increased by the ultrasonic waves, the dispersion effect is increased and solubilities of the arsenic and silicate are increased. In the present embodiment, a frequency of the ultrasonic waves has no significant effect. The reason for this is that, in a case in which a stationary suspension is irradiated with ultrasonic waves, an effect of frequency is large, but, in a case in which stirring is performed as in the present embodiment, the effect of frequency is reduced.

As described above, in the present invention, since the washing and dispersion of the contaminated soil are performed by using the basic solution and ultrasonic waves, arsenic is separated from the soil.

The washing and dispersion process is completed and magnetic materials, such as the iron oxide and manganese oxide present in the solution, are then separated by magnetic separation. The iron oxide and manganese oxide are detached into the solution while the surface of the silicate is dissolved by the sodium hydroxide solution during the washing and dispersion process, and the magnetic separation removes the iron oxide and manganese oxide. The iron oxide is ferromagnetic or paramagnetic, and most particles constituting the soil are diamagnetic. Thus, the iron oxide and manganese oxide may be separated by the magnetic separation. That is, although the arsenic is desorbed from the iron oxide and manganese oxide through the washing and dispersion process, there is a possibility that arsenic is still adsorbed to and co-precipitated with the iron oxide and manganese oxide. Accordingly, the iron oxide and manganese oxide may be removed from the soil for more complete restoration of the contaminated soil. The reason for performing the magnetic separation after the washing and dispersion process is to increase the effect of the magnetic separation through the dispersion of the suspension. Separation efficiency is decreased in a state in which the soil forms an aggregate.

In the present embodiment, the iron oxide and manganese oxide as well as other magnetic heavy metals may be removed from the suspension by a magnet through wet magnetic separation. The strength of the magnet may be variously adjusted according to characteristics of the contaminated soil, wherein, as the result of an investigation focused on the iron oxide and manganese oxide, it may be confirmed that it is the most effective when the magnet having a strength of 5,000 gauss to 9,000 gauss is used. The iron oxide, manganese oxide, and magnetic materials separated by the magnet may be subjected to a separate post-treatment process or may be discarded.

After the magnetic separation, the soil in a solid state and the solution in a liquid state are separated from each other through solid-liquid separation. A centrifuge may be used. Since the liquid after the solid-liquid separation contains a large amount of arsenic, the liquid may be again subjected to a separate washing process or may be treated as a waste. Since the soil is in state in which arsenic is removed therefrom, the soil may be restored by filling back to its original position or may be used for other purposes.

Researchers of the present invention performed experiments for investigating the effect of the method of restoring heavy metal-contaminated soil.

Arsenic-contaminated soil around the old Janghang refinery was collected and dried, and the soil having a particle diameter of less than 2 mm was then recovered by using a 2 mm sieve and used in the experiments. The soil and a 0 M to 1.5 M NaOH washing-dispersion solution mixed at a ratio of 1:10 were shaken for 2 hours and washing-dispersion was then performed by irradiating the mixture with ultrasonic waves for 10 minutes. A 0.5 M NaOH solution and the soil at a ratio of 1:4 were shaken for 2 hours and irradiated with ultrasonic waves for 10 minutes.

After the washing-dispersion, the mixture was separated into magnetic particles and non-magnetic particles at a magnetic field strength of 3,000 gauss, 6,000 gauss, and 9,000 gauss. The concentration of arsenic in the soil produced at each stage was measured by using the soil contamination process test method. The results thereof are presented in FIGS. 2 to 3.

Experimental results show the effect of the present invention, wherein

In experiment, 3 cases are prepared to compare turbidities of suspensions respectively in a case of only using distilled water, a case of only using sodium hydroxide, and a case of performing ultrasonic irradiation as well as using sodium hydroxide.

In the case that the washing by using the basic solution as well as the dispersion by using ultrasonic waves was performed, the turbidity of the solution was the highest. Since contaminants moved to the solution and the particles in the solution were uniformly dispersed, the turbidity may increase. With respect to FIG. 2, in which the washing was only performed by using the basic solution and the ultrasonic irradiation was not performed, it appeared that dispersion was not uniform.

Referring to tables of FIGS. 2 and 3, a similar dispersion-washing effect was obtained at a NaOH concentration of 0.2 M to 1 M, but the dispersion-washing effect was higher for the case of the ultrasonic irradiation than the case without the ultrasonic irradiation.

With respect to the strength of the magnetic field, arsenic removal efficiency was higher when using the magnetic fields having a strength of 6,000 gauss and 9,000 gauss than using the magnetic field having a strength of 3,000 gauss. However, the similar arsenic removal efficiency was obtained for the magnetic fields having a strength of 6,000 gauss and 9,000 gauss.

In the present experiment, when the 0.2 M to 1 M NaOH solution and the contaminated soil were reacted for 1 hour or more and irradiated with ultrasonic waves for 10 minutes, 60% or more of the arsenic may be removed from the soil, and, in addition, it was confirmed that the concentration of the arsenic may be reduced to a reference value for environmental contamination of 25 mg/kg or less when the magnetic separation was performed at a magnetic field strength of 6,000 gauss or more.

As described above, according to the present invention, the reference value of the soil contamination process test method may be satisfied in the case that arsenic was removed by washing the contaminated soil with the basic solution and simultaneously irradiating the soil with ultrasonic waves.

With respect to a typical acid washing process, arsenic was dissolved by acid and the arsenic was then readsorbed to iron oxide and manganese oxide so that an arsenic removal rate was reduced. However, in the present invention, the above limitation was addressed by using the alkaline washing. It is considered that the above results were obtained due to the fact that the desorption of arsenic, the dispersion of the particles and the increase of the solubility were promoted by the ultrasonic irradiation as well as the alkaline washing.

According to the present invention, in a case in which arsenic is removed by washing contaminated soil using a basic solution and simultaneously irradiating the soil with ultra sonic waves, reference values of the soil contamination process test method may be satisfied.

In a typical method, it has been particularly difficult to remove a residual form of arsenic. However, in the present invention, since iron oxide and manganese oxide may be exposed to the basic solution by dissolving a portion of the surface of a silicate mineral using the basic solution, the residual form of arsenic may be removed.

With respect to a typical acid washing method, since arsenic is dissolved by acid and the arsenic is then re-adsorbed on iron oxide and manganese oxide, an arsenic removal rate is reduced. However, in the present invention, the above limitation is addressed by using alkaline washing.

It is considered that the above result is due to the fact that the irradiation of ultrasonic waves as well as the alkaline washing is preformed to promote the desorption of arsenic, the dispersion of particles, and the increase of solubility.

Although effects are not explicitly mentioned herein, the effects described in the following specification and their provisional effects, which are expected by the technical features of the present invention, will be considered as if the effects are described in this specification.

The protective scope of the present invention is not limited to the embodiments that illustratively described above. Further, it will be understood that the protective scope of the present invention is not limited by obvious modifications or substitutions in the technical fields of the present invention.

What is claimed is:

1. A method of restoring heavy metal-contaminated soil, the method comprising:
    a particle size separation step of separating coarse-grained soil and fine-grained soil from each other by performing particle size separation on heavy metal-contaminated soil;
    a washing and separation step of forming a suspension by adding the fine-grained soil to a basic solution and separating a heavy metal from the fine-grained soil by irradiation of ultrasonic waves; and
    a step of collecting the fine-grained soil completed with a solid-liquid separation treatment of the suspension.

2. The method of claim 1, wherein the heavy metal is arsenic.

3. The method of claim 1, further comprising a magnetic separation step of separating a magnetic material and a non-magnetic material in the suspension from each other by using a magnet, after subjecting to the washing and separation step.

4. The method of claim 3, wherein the magnet having a magnetic field strength of 5,000 gauss to 9,000 gauss is used to separate the magnetic material including iron oxide.

5. The method of claim 3, wherein the magnetic material separated by the magnetic separation is reprocessed or discarded, and a liquid discharged by the solid-liquid separation treatment is subjected to a wastewater treatment.

6. The method of claim 1, wherein, in the particle size separation step, the coarse-grained soil and the fine-grained soil are separated based on a particle size of 1 mm to 3 mm.

7. The method of claim 1, wherein the basic solution has a pH value of equal to or greater than a point of zero charge (PZC) of the contaminated soil.

8. The method of claim 1, wherein a sodium hydroxide aqueous solution is used as the basic solution to improve dispersion efficiency of the fine-grained soil.

9. The method of claim 1, wherein the ultrasonic waves are irradiated for 10 minutes to 120 minutes.

10. The method of claim 1, wherein a maximum local pressure of 1,000 atm and a maximum local temperature of 5,000 K in the suspension are obtained by the irradiation of the ultrasonic waves.

11. The method of claim 1, wherein the basic solution comprises 0.1 M to 1 M NaOH and a solid-liquid ratio (volume ratio) of the contaminated soil to the basic solution is in a range of 1/4 to 1/10.

12. The method of claim 1, wherein the heavy metal comprises at least one of copper, cadmium, and zinc.

* * * * *